United States Patent [19]
Howell et al.

[11] Patent Number: 5,724,224
[45] Date of Patent: Mar. 3, 1998

[54] INTEGRATED PALM REST AND BATTERY PACK HAVING FIRST AND SECOND PALM REST SURFACES DEFINING A PAIR OF ADJACENT ARCUATE SURFACES IN A PORTABLE COMPUTER SYSTEM

[75] Inventors: Bryan Howell; Steve Gluskoter, both of Austin, Tex.

[73] Assignee: Dell USA, L.P., Austin, Tex.

[21] Appl. No.: 733,954

[22] Filed: Oct. 21, 1996

[51] Int. Cl.⁶ .................................. G06F 1/16; H05K 5/02
[52] U.S. Cl. .......................... 361/680; 361/683; 400/715
[58] Field of Search .................... 400/715; 248/118.1; 429/96–100; 361/680–687; 364/708.1

[56] References Cited

U.S. PATENT DOCUMENTS

| | | | |
|---|---|---|---|
| D. 365,335 | 12/1995 | Busch et al. | D14/106 |
| 5,305,238 | 4/1994 | Starr, III et al. | 364/569 |
| 5,375,800 | 12/1994 | Wilcox et al. | 248/118.1 |
| 5,513,824 | 5/1996 | Leavitt et al. | 400/715 X |
| 5,536,590 | 7/1996 | Cheiky | 429/97 X |
| 5,621,299 | 4/1997 | Krall | 320/5 |

*Primary Examiner*—Michael W. Phillips
*Attorney, Agent, or Firm*—Haynes and Boone L.L.P.

[57] ABSTRACT

An integrated palm rest and battery pack in a portable computer system includes a base member of the portable computer having a keyboard. The base member has a multi-level surface adjacent the keyboard. A first portion of the multi-level surface defines a palm rest surface. A second portion of the multi-level surface simultaneously defines an extended palm rest area and a battery housing. The two portions define a pair of adjacent arcuate cascading surfaces.

12 Claims, 2 Drawing Sheets

INTEGRATED PALM REST AND BATTERY PACK HAVING FIRST AND SECOND PALM REST SURFACES DEFINING A PAIR OF ADJACENT ARCUATE SURFACES IN A PORTABLE COMPUTER SYSTEM

BACKGROUND OF THE INVENTION

This invention relates generally to an integrated palm rest and battery pack in a portable computer system and more particularly to providing an extended palm rest surface which also houses additional battery power.

The recent popularity of portable, battery powered computers is attributed to their compact size, light weight and portability. The notebook size portable computer typically has about an 8.5 inch by 11 inch footprint and is fully self-contained including battery power. Typically, a hinged top or lid is rotated from a nested position with a horizontal base to a substantially vertical position. This "opening" of the notebook style computer reveals a keyboard in an exposed horizontal surface of the base and a monitor screen in an exposed portion of the substantially vertical lid adjacent the keyboard.

As is common with portable, battery powered devices, the limitations on time of use are directly proportional to the stored energy in the self-contained battery pack. These battery packs can be recharged for re-use, and during recharging, they are usually replaced by a substitute battery pack if available to the user. In order to increase the available time of use when the computer is being operated, additional battery cells would be required. However, the addition of cells would increase the size and weight of the portable computer without some added benefit, which is contrary to desired design parameters.

Another limitation associated with the compact size of the portable computers is related to "human factors engineering" or "ergonomics." The reduced size of the keyboard versus the size of the human hand are competing factors. Added stress may be inflicted on the users' arms if typing comfort is not achieved. Palm rests on notebook computers have proven to be of ergonomic benefit to the user. The market is saturated with aftermarket ergonomic wrist rests, and the like, for desktop keyboards and notebooks to make up for the inherent limitations of present designs. One approach to a solution is the use of neoprene blocks placed in front of both desktop keyboards and notebook computers to provide elevated wrist and/or palm rests.

One common design limitation is that which forces the user to constantly hold his or her hands and wrists high above the table top or notebook to reach the keyboard without providing an immediate place to rest the hands while not typing. The desired or correct approach to comfort during keyboard use calls for a dead surface area or empty area, i.e., containing no keys, directly in front of and approximately at the level of the keys on the keyboard and upon which the hands or wrists can be rested. The size of this dead area should be as large as possible to accommodate a variety of hand sizes. Also, it should be of a sufficient size to allow the user to rest his or her entire hand and wrist easily and with minimal horizontal movement. Unfortunately, the size and space constraints placed on present notebook size portable computers have reduced or removed completely satisfactory ergonomic palm rests.

Therefore, what is needed is an apparatus and method for extending the palm rest area on a portable computer wherein the extended area provides an added benefit which compensates for the size increase. It is also highly desirable to provide extended power which increases the available time of use when the computer is being operated.

SUMMARY OF THE INVENTION

The present invention, accordingly, provides an apparatus and method for providing an extended palm rest area on a portable computer while simultaneously adding usable and beneficial size to the computer. The extended area provides a housing for additional batteries which increase the available time of use for operating the computer. To this end, a portable computer system provides an integrated palm rest area and battery pack. A base member of the portable computer includes a keyboard. A first palm rest surface of the base portion is adjacent the keyboard. A housing is attached to extend from the base member. The housing forms a second palm rest surface and simultaneously defines an expanded battery storage area.

A principal advantage of the present invention is that the usable area of the palm rest is extended by about one inch and simultaneously creates added space for housing a twelve cell battery pack. This is in contrast to the prior art shortened standard palm rest area and the standard eight cell battery pack.

DESCRIPTION OF THE PREFERRED EMBODIMENT

Figure 1:
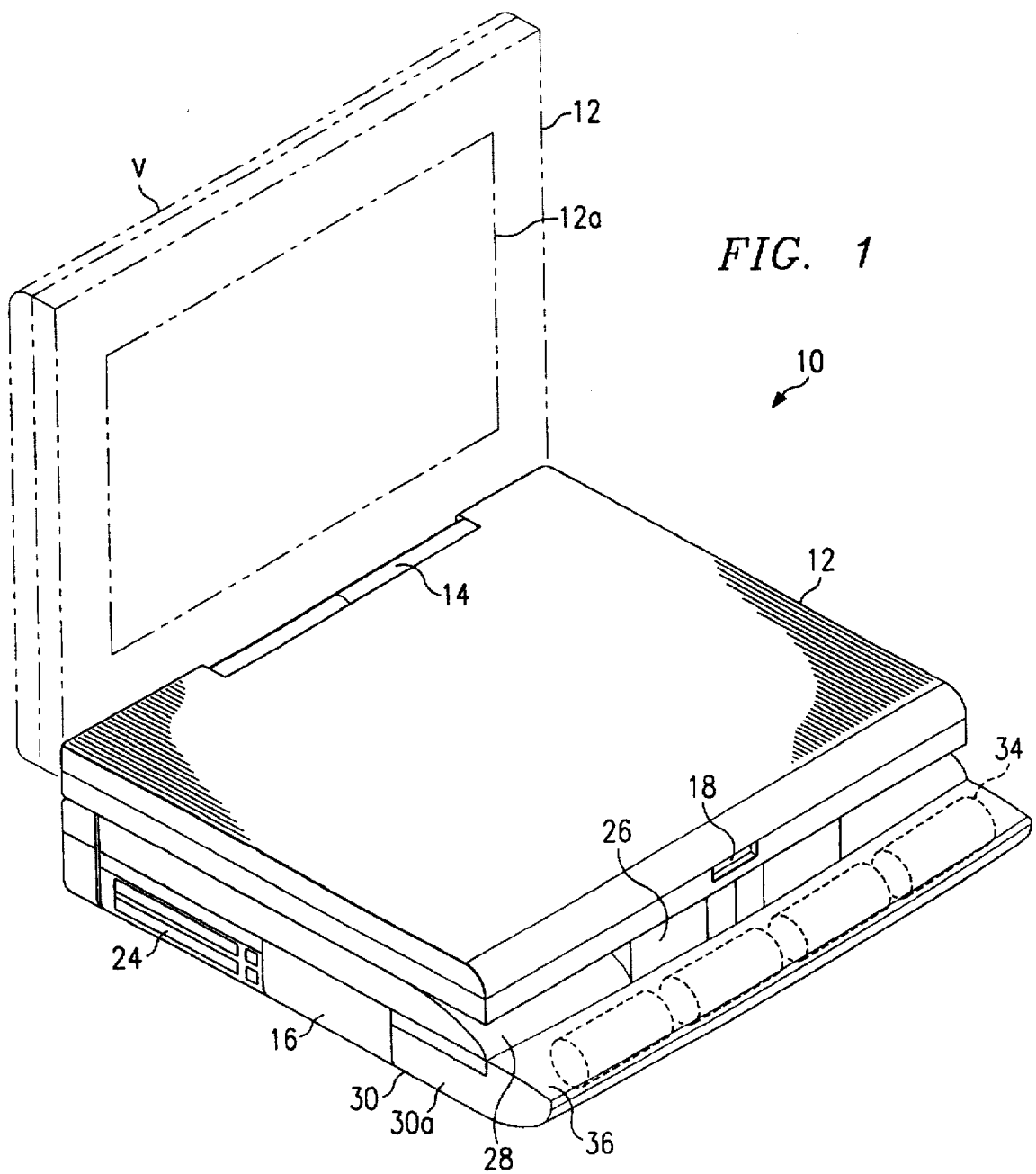
FIG. 1 is an isometric view illustrating an embodiment of the portable computer according to the present invention.
Figure 2:
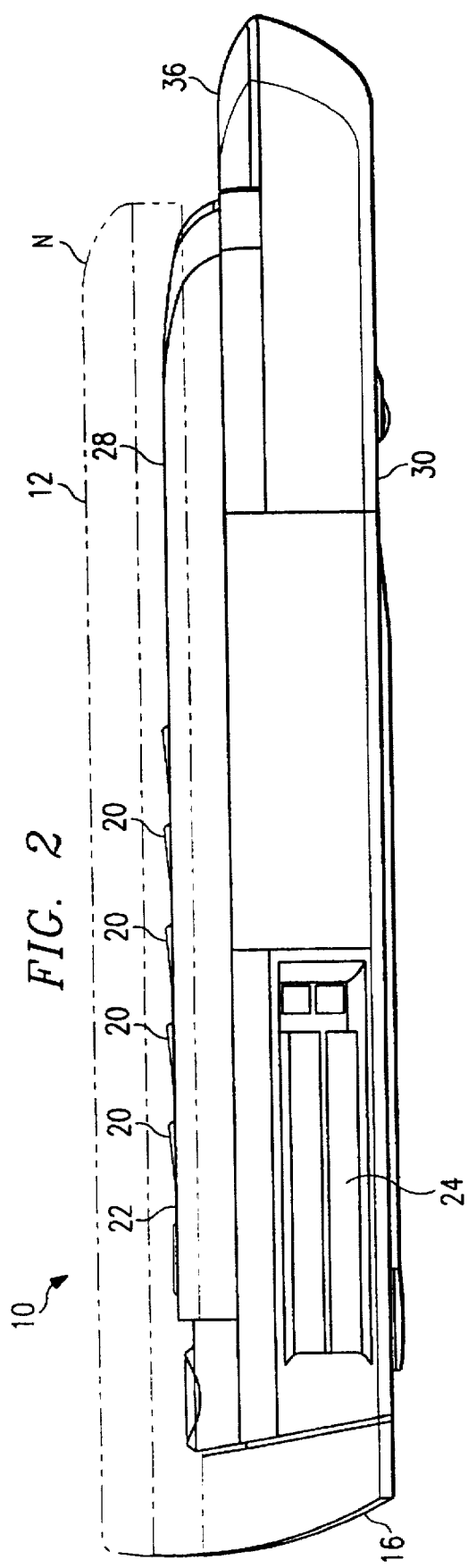
FIG. 2 is a side view illustrating an embodiment of the portable computer according to the present invention.

Referring to FIGS. 1 and 2, illustrated is a portable, notebook size computer designated 10 comprising a self-contained system and including a hinged top or lid 12 rotatable about a hinge 14 from a nested position "N", FIG. 2, with a horizontal base 16, to a substantially vertical or open position "V" shown in FIG. 1. Opening of the notebook style portable computer by manipulation of a latch 18, reveals a plurality keys 20, FIG. 2, on an exposed horizontal keyboard surface 22 of base 16, and a monitor screen 12a in an exposed portion of lid 12, FIG. 1. Computer 10 also includes a plurality external ports, an exemplary one of which is designated 24 in FIGS. 1 and 2. Base 16 may also include a pointing device 26, FIG. 1, such as a track pad, track ball or the like. A primary palm rest surface 28 is commonly provided adjacent keyboard 22 as illustrated in FIGS. 1 and 2.

Figure 4:
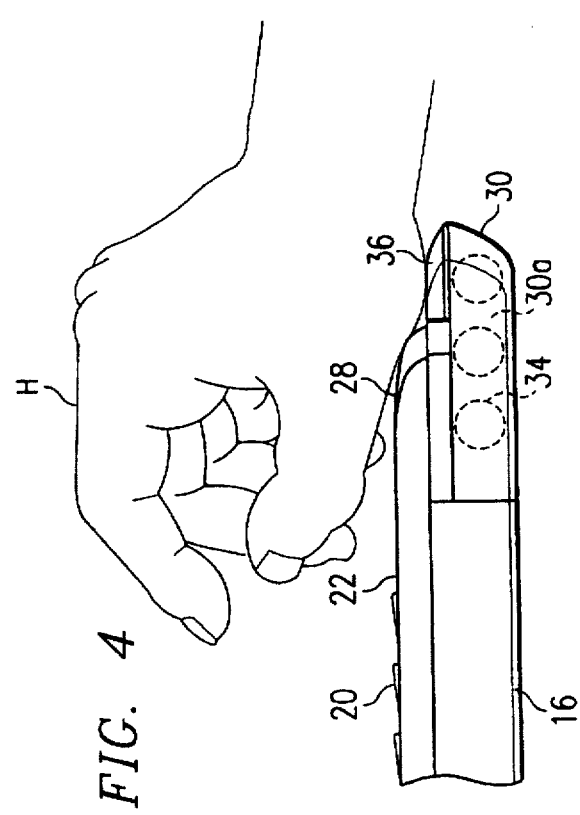
FIG. 4 is a partial side view illustrating an embodiment of an extended battery pack and combined expanded palm rest area according to the present invention.
Figure 3:
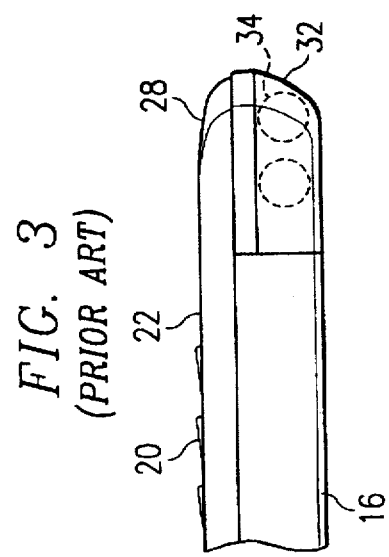
FIG. 3 is a partial side view illustrating a prior art battery pack and palm rest area of a portable computer.

An extended battery housing 30, FIG. 4, can be used to replace a standard size prior art battery housing 32, FIG. 3. The standard battery housing 32 typically houses 8 power cells 34 arranged in two rows of four cells across the width of housing 32 which is the same width as base 16. The extended battery housing 30, FIG. 4, defines an interior space 30a which can house three rows of four power cells 34 across the width of housing 32, which is also the same width as base 16. Housings 30 and 32 are completely interchangeable and readily attach to and detach from base 16.

Due to the extended size of housing 30, an extended or secondary palm rest surface 36 for supporting a hand designated "H" in FIG. 4, is provided in a stepped-down, multi-level arrangement immediately adjacent keyboard primary palm rest surface 28. Thus, housing 30 provides greater power cell capacity in space 30a and simultaneously provides expanded palm rest capability by virtue of extended surface 36 which is part of housing 30. In particular, housing 30 which is an extension to base member 16, defines the extended palm rest surface 36 which is a surface cover for battery housing 30.

By the attachment of battery housing 30 to base member 16, a multi-level surface is provided adjacent keyboard surface 22. The multi-level surface thus provided includes as a first portion thereof, the primary palm rest surface 28, and also includes as a second portion thereof, the extended, secondary palm rest surface 36. The first and second portions of the multi-level surface form a pair of adjacent curved or scalloped surfaces in a cascade arrangement.

In operation, existing battery housing 32, FIG. 3, is detached from base 16 and is replaced by extended battery housing 30, FIG. 4. In so doing, the extended palm rest area 36 and the added power storage space 30a are provided to portable computer 10. The dual purpose, dual function of housing 30 provides multi-level palm rest surfaces including primary palm rest surface 28 adjacent keyboard 22 and extended palm rest surface 36 which is a surface cover for extended battery housing 30.

As it can be seen, the principal advantages of the invention are that the usable area of the palm rest is extended by about one inch and simultaneously, added space is provided for housing a twelve cell battery pack. The twelve cell pack is the same height and width as the standard eight cell pack but due to its extended length, adds or extends the palm rest area. When the twelve cell pack is attached to the portable computer in place of the eight cell pack, it extends the forward edge of the base portion of the portable computer by one inch. In doing so it extends the usable area of the palm rest and simultaneously provides extended usable power and operating time to the portable computer due to the added space for four additional power cells. The ergonomic quality and the potential operating time of the notebook type personal computer are simultaneously enhanced by substitution of the extended battery pack in place of the standard battery pack.

Although illustrative embodiments of the invention have been shown and described, a wide range of modifications, change and substitution is contemplated in the foregoing disclosure and in some instances, some features of the present invention may be employed without a corresponding use of other features. Accordingly, it is appropriate that the appended claims be construed broadly and in a manner consistent with the scope of the invention.

What is claimed is:

1. A portable computer apparatus comprising:

a base member supporting a keyboard;

a first palm rest surface defined by an arcuate terminal end of the base member adjacent the keyboard; and a housing attached to and extending from the base member, the housing forming a second palm rest surface extending from the first palm rest surface and including an arcuate portion, the second palm rest surface simultaneously defining an expanded battery storage space, whereby the first and second palm rest surfaces define a pair of adjacent arcuate surfaces.

2. The apparatus as defined in claim 1 wherein the first palm rest surface is at a first horizontally extending level and the second palm rest surface is at a second horizontally extending level which is stepped downwardly from the first palm rest surface.

3. The apparatus as defined in claim 1 wherein the first and second palm rest surfaces form multi-level surface areas.

4. The apparatus as defined in claim 1 wherein the housing defines a power cell storage space sufficient to store more than eight power cells.

5. The apparatus as defined in claim 1 wherein the housing defines a power cell storage space sufficient to store at least twelve power cells.

6. The apparatus as defined in claim 1 wherein the first palm rest surface slopes downwardly and terminates at the second palm rest surface, whereby adjacent multi-level palm rest surface areas are formed.

7. In a portable computer system, apparatus for providing an integrated palm rest and battery pack comprising:

a base member of the portable computer including a keyboard;

a battery housing attached to the base member adjacent the keyboard, the housing and base member forming multi-level surfaces adjacent the keyboard;

a first portion of the multi-level surfaces defining a first palm rest surface at an arcuate terminal end of the base member; and a second portion of the multi-level surfaces defining a second palm rest surface extending from the first palm rest surface and including an arcuate portion, the second palm rest surface also being a cover for the battery housing, whereby the first and second palm rest surfaces define a pair of adjacent arcuate cascading surfaces.

8. The apparatus for providing an integrated palm rest and battery pack as defined in claim 7 wherein the second palm rest surface is stepped downwardly from the first palm rest surface.

9. The apparatus for providing an integrated palm rest and battery pack as defined in claim 7 wherein the first palm rest surface slopes downwardly and terminates at the second palm rest surface.

10. The apparatus for providing an integrated palm rest and battery pack as defined in claim 7 wherein the battery housing defines a power cell storage space sufficient to store more than eight power cells.

11. The apparatus for providing an integrated palm rest and battery pack as defined in claim 7 wherein the battery housing defines a power cell storage space sufficient to store at least twelve power cells.

12. In a portable computer system, a method of providing an integrated palm rest and extended battery pack comprising the steps of:

providing a base member of the portable computer including a keyboard having an adjacent primary palm rest surface substantially level with the keyboard and defining an arcuate terminal end of the base member; and attaching an extended battery housing to the base member forming a stepped-down secondary palm rest surface extending from the first palm rest surface, the secondary palm rest surface including an arcuate portion so that the first and second palm rest surfaces define a pair of adjacent arcuate cascading surfaces.

* * * * *